Patented Mar. 24, 1936

2,035,346

UNITED STATES PATENT OFFICE 2,035,346

SYNTHETIC RESIN

Norman D. Scott, Niagara Falls, N. Y., assignor to E. I. du Pont de Nemours & Company, Wilmington, Del., a corporation of Delaware No Drawing. Application April 2, 1934, Serial No. 718,743

5 Claims. (Cl. 260—8)

This invention relates to synthetic resins, to compositions containing them, and more particularly to improved synthetic resins of the polyhydric alcohol-polycarboxylic acid type.

This invention has as an object the preparation of new and valuable synthetic resins. Another object is the preparation of durable, light colored and fast drying synthetic resins which are soluble and fusible, which can be blended with cellulose derivatives, oils, etc., and which possess characteristics of both aliphatic and aromatic acid resins. Other objects will appear hereinafter.

These objects are accomplished by synthesizing said resins from polyhydric alcohols and polycarboxylic acids of the kind illustrated by 1,4-dihydro-1,4-dicarboxy naphthalene which has the formula:

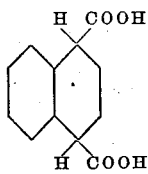

The acids of the type mentioned, which are dihydrogenated polycyclic dicarboxylic acids having a carbocyclic ring wholly aromatic in character and having in another ring the two added hydrogen atoms attached to different carbon atoms each of which is joined to a carboxyl group, are made by reacting polynuclear cyclic hydrocarbons, such as naphthalene, phenanthrene, anthracene, abietene, diphenyl, pyrene, chrysene, picene, and the like with an alkali metal, e. g. sodium or lithium, preferably in ether solution, followed by carboxylation of the alkali metal derivative. The acids obtained upon carboxylation of the sodium derivatives of the above mentioned cyclic hydrocarbons sometimes consist of a mixture of isomers.

The resins of my invention in their simplest embodiment are comprised of the two resin forming elements, namely, the polyhydric alcohol and the aromatic-alicyclic polycarboxylic acid containing the carboxyl group attached to the alicyclic nucleus.

In carrying out my invention the polycarboxylic acid described above with or without a modifying agent (alcohols, esters, or organic acids of other types), is heated with a polyhydric alcohol for a sufficient time to bring about the desired degree of condensation. Any of the methods well known to the art may be employed in the preparation of the resins of this invention.

Likewise, variations in the order of reacting the ingredients may be made without departing from the spirit or scope of this invention. Modifying agents, such as natural resins, fatty oil acids, monohydric alcohols, etc. may be included in the reaction mixture to bring about desired changes in drying properties, film flexibility, etc.

The following examples are illustrative of the methods used in synthesizing the resins:

Example I

| | |
|---|---:|
| Glycerol | 21.94 |
| 1,4-dihydro-1,4-dicarboxy naphthalene | 78.06 |
| Total | 100.00 |

The ingredients were mixed in the cold, heated up to 200° C. in one and one-half hours, and held at that temperature for one hour. The product obtained was a light colored, hard resin, soluble in aromatic hydrocarbon solvents, and had an acid number of 149. Glyceryl phthalate resin of approximately the same acid number is not soluble in hydrocarbons.

Example II

| | |
|---|---:|
| Glycerol | 17.8 |
| 1,4-dihydro-1,4-dicarboxy naphthalene | 52.1 |
| Linseed oil acids | 30.1 |
| Total | 100.0 |

The ingredients were mixed in the cold, heated up to 200° C. in forty-five minutes, and held at that temperature for thirty minutes. The product obtained was a light colored solid and had an acid number of 64.5. It was soluble in aromatic hydrocarbon and ester solvents.

An example of the use of the resins of this invention in coating compositions is given below:

Example III

| | |
|---|---:|
| Resin of Example II | 43.24 |
| Ethoxyethanol | 56.76 |
| Total | 100.00 |

The above solution was applied over filled, stained mahogany, and over primed steel, and the system exposed to the weather in comparison with similar resin prepared from phthalic anhydride. After six months' exposure, the resin of Example II showed better durability than the corresponding phthalic anhydride analog exposed at the same time.

The polycarboxylic acid used in the examples may be replaced by other polynuclear aromatic-alicyclic polycarboxylic acids obtained by carboxylation of the sodium derivatives of hydrocarbons such as anthracene, phenanthrene, diphenyl, retene, abietene, chrysene, pyrene, picene, and the like.

Suitable polyhydric alcohols in addition to glycerol include polyglycerols; polyglycols, e. g., diethylene glycol; ethylene glycol and higher glycols, e. g. butylene glycol and hexamethylene glycol; pentaerythritol; mannitol; triethanolamine; etc.

Suitable modifying agents for the resins of this invention include monohydric alcohols, e. g. ethyl alcohol, amyl alcohol, benzyl alcohol, borneol, heptyl alcohol, dodecyl alcohol, octadecyl alcohol, the mixture of higher alcohols obtained as by-products in the hydrogenation of coconut oils or by the hydrogenation of carbon oxides to methanol, etc; drying, semi-drying, and non-drying oils and/or the acids derived therefrom, e.g. linseed oil and oil acids, China wood oil and oil acids, coconut oil and oil acids, cottonseed oil and oil acids (distilled), castor oil and oil acids, etc.; natural resins (or resin acids) and esters thereof, and the hydrogenated derivatives of both, e. g. rosin, kauri, damar, hydrogenated ethyl abietate, ester gum, and hydrogenated ester gum.

The polynuclear aromatic-alicyclic polycarboxylic acid may be substituted in part by other polybasic acids, e. g. phthalic and substituted phthalic acids, succinic, adipic, fumaric, malic, maleic, mellitic, pyromellitic, keto - succinic, amino-succinic, salicylacetic, thiodiglycollic, etc. When the fatty oils are used as modifying agents these should be first heat treated with the polyhydric alcohol to form the mono and di-glycerides before reacting with the polybasic acid.

The resins of this invention can be combined with oils and certain cellulose derivatives, and thus find useful application in the manufacture of other types of coating compositions. The resins synthesized and disclosed herein can be blended by heating, by mutual solvents, or by other means with one or more of the following substances: drying, semi-drying, and non-drying oils and the acids derived therefrom; cellulose derivatives, e. g. nitrocellulose, cellulose acetate, ethyl cellulose, benzyl cellulose, etc.; natural resins and ester gums, e. g. rosin, copal, Congo, kauri and rosinglycerol ester; other synthetic resins and resinforming materials, e. g. metastyrene, coumaroneindene resins, vinyl resins, casein, acrylic ester polymers; other polyhydric alcohol-polycarboxylic acid resins; bitumens, e. g. natural and processed asphalts; natural and synthetic waxes, e. g. Montan wax, beeswax, candelilla wax, carnauba wax, dodicyl stearate, etc.; and other ester-like bodies, e. g. stearin, tricresyl phosphate, dibutyl phthalate, hydrogenated castor oil, castor oil, etc. To my products either alone or combined with one or more of the above enumerated substances, may be added pigments, fillers, solvents, plasticizers, anti-oxidants, lakes, etc., as needed and desired in accordance with methods known to the art.

In addition to the particular use as coating compositions, any one of the above enumerated combinations may be used as impregnating and coating agents for paper, cloth, wood, porous stone, rubberized flexible fabric sheet materials, etc.; as sandwiching material or adhesive therefor in the manufacture of shatterproof glass; as linoleum plastics for the manufacture of floor coverings; as adhesive cements and sealing waxes for general use; and as binding agents for mica, asbestos, and the like in the manufacture of insulating materials; as a binder for cotton flock in the manufacture of artificial suede, etc.

My improved resins show definite advantages over the phthalic anhydride resins in their lighter color, superior drying properties, and better durability on outdoor exposure. It is possible by the present invention, which employs resin ingredients of a unique character, to prepare resins having characteristics found on the one hand only in aromatic acid resins (light color, fast drying, good durability) and on the other hand only in aliphatic acid resins (tenacity, toughness, pliability, and strength). This has not heretofore been possible.

As many apparently widely different embodiments of this invention may be made without departing from the spirit and scope thereof, it is to be understood that I do not limit myself to the specific embodiments thereof except as defined in the following claims:

I claim:

1. A polyhydric alcohol-polycarboxylic acid resin comprising the reaction product of polyhydric alcohol and a dihydrogenated polycyclic polycarboxylic acid having a wholly aromatic carbocyclic ring and having in another ring the two added hydrogen atoms attached to different carbon atoms each of which is joined to a carboxyl group, said acid being obtained by carboxylation of alkali metal derivatives of aromatic polynuclear hydrocarbons.

2. The resinous reaction product of a polyhydric alcohol and 1,4-dihydro-1,4-dicarboxy naphthalene.

3. A polyhydric alcohol-polycarboxylic acid resin comprising the reaction product of glycerol and 1,4-dihydro-1,4-dicarboxy naphthalene.

4. A process for making resins which comprises heating a polyhydric alcohol and 1,4-dicarboxy naphthalene until resinification takes place.

5. A process for making resins which comprises heating glycerol and 1,4-dihydro-1,4-dicarboxy naphthalene until resinification takes place.

NORMAN D. SCOTT.